United States Patent [19]

Arkell et al.

[11] Patent Number: 4,838,451

[45] Date of Patent: Jun. 13, 1989

[54] WIRE BASKET WITH FLEXIBLE LINER SECURED BY A CLIP

[75] Inventors: Nigel J. Arkell, Portland; Brian G. Sartor, Aloha; David L. Prevost, Portland, all of Oreg.

[73] Assignee: Leslie Ford Brown, Lake Oswego, Oreg.

[21] Appl. No.: 176,299

[22] Filed: Mar. 31, 1988

[51] Int. Cl.$^4$ .............................................. B65D 90/04
[52] U.S. Cl. .................................. 220/401; 24/571
[58] Field of Search .................. 24/570, 571, 339; 220/401, 404

[56] References Cited

U.S. PATENT DOCUMENTS

| | | | |
|---|---|---|---|
| 920,313 | 5/1909 | Franklin | 220/401 |
| 1,895,656 | 1/1933 | Gadke | 24/339 |
| 2,301,032 | 11/1942 | Fielding | 220/404 |
| 2,561,143 | 7/1951 | Schmitz | 220/401 |
| 2,807,454 | 9/1957 | Beadle | 220/401 |
| 2,938,252 | 5/1960 | Scheemaeker . | |
| 3,228,640 | 1/1966 | Wolsh | 24/339 |
| 3,983,602 | 10/1976 | Barry | 24/339 |
| 4,002,349 | 1/1977 | Dopp | 24/339 |
| 4,039,119 | 8/1977 | Crane . | |
| 4,039,121 | 8/1977 | Crane . | |
| 4,526,285 | 7/1985 | Cerveny et al. . | |
| 4,528,800 | 7/1985 | Bums | 24/570 |
| 4,593,441 | 6/1986 | St. Louis . | |

OTHER PUBLICATIONS

2 Brochure pages of an accessory called a "Basket Stop", Manufactured by Clairson International for their Closet Maid Product Line.

*Primary Examiner*—Stephen P. Garbe
*Attorney, Agent, or Firm*—Kolisch, Hartwell & Dickinson

[57] ABSTRACT

A clip for securing sheet material to a rod. The clip includes a body which has a central portion that contains a channel having an opening which is deformable to enable a rod to pass through the opening to be seated in the channel. The clip further includes gripping means which comprises a pair of substantially parallel legs in the body extending in the same direction and disposed laterally outwardly of the central portion and spaced from the central portion by slots. In operation, the clip is attached to a rod by passing the rod through the channel opening and seating the rod in the channel. Sheet material is then passed over one side of the central portion of the clip and the oppositely facing sides of the legs. A plurality of clips can be used to secure a flexible lining to a wire container.

10 Claims, 1 Drawing Sheet

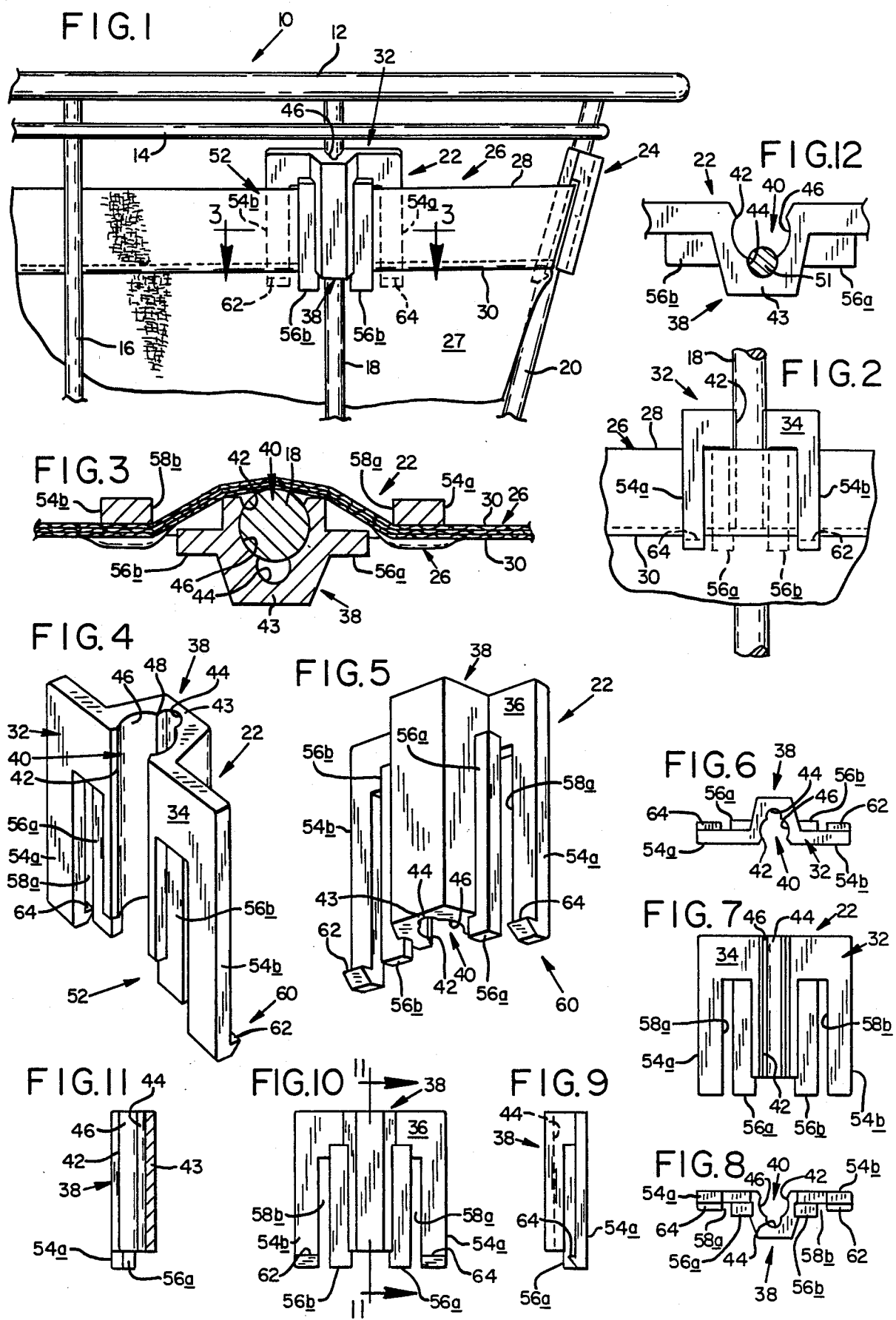

WIRE BASKET WITH FLEXIBLE LINER SECURED BY A CLIP

BACKGROUND AND SUMMARY OF THE INVENTION

The present invention relates to a clip for securing sheet material to a rod. In a particular embodiment, the clip is adapted for securing a liner to a basket of wire-like rods.

Shelving and storage systems comprised of vinyl coated wire rods have become increasingly popular in businesses and residences as an economical and convenient method of creating shelving and drawer space for offices, closets, kitchens, bedrooms, utility rooms, linen closets, garages and pantries.

Grids of interconnecting wire-like rods which are mounted on a wall are increasingly used in workplaces, such as offices, kitchens and garages, to hang objects from removable hooks attached to the grids. Presently, there is nothing on the market known to applicants which could be used to secure paper or fabric sheet material to a rod on such a grid.

These storage systems also frequently include baskets of interconnecting wire-like rods which are slidable on runners mounted on a frame. Generally these baskets are constructed so that the rods are not tightly interwoven, but rather have large openings at the sides and at the bottom of the basket. One of the problems with these basket storage systems is that items stored therein frequently fall through the openings in the baskets. One of the ways to overcome this problem is to line the interior of the basket with a liner of sheet material extending along the sides and the bottom of the basket. However, in order to keep the liner in place, it would be necessary to provide a means for removably securing the liner of sheet material to a rod on the basket.

Accordingly, it is a general object of the present invention to provide a clip for detachably securing sheet material in place on a rod.

Another object of the present invention is to provide a clip which has means on the body of the clip adapted to seat about a portion of a rod to mount the clip on the rod.

A further object of the invention is to provide a clip in which the means for mounting the clip on a rod accommodates different gauge diameter rods.

Yet a further object of the invention is to provide a clip for securing sheet material to a rod which is sturdy in construction, is nondestructive to the sheet material and is inexpensive to manufacture.

Another object of the invention is to provide a multi-positionable clip which can be used to secure different kinds of sheet material to a wire rod.

A preferred embodiment of the present invention includes a clip for securing sheet material to a rod wherein the clip has a body which has a central portion and the central portion contains a channel having a channel opening which is deformable to enable the rod to pass through the opening to be seated in the channel. The clip further includes gripping means which comprises a pair of substantially parallel legs in the body extending in the same direction as the channel and disposed laterally outwardly of the central portion and spaced from the central portion by slots.

In operation, the clip is attached to a rod by aligning the channel opening of the clip with the longitudinal axis of the rod, and then pressing the clip against the rod thereby seating the rod in the channel. The sheet material is then passed over one side of the central portion of the clip and the oppositely facing sides of the legs. When the clip is used to secure a basket liner to a basket of interwoven rods, two clips may be placed adjacent each corner of the basket at the liner's upper edges. The sheet material may be removed from the clip simply by grasping a portion of sheet material adjacent the clip and pulling downwardly on the sheet material.

With the construction described, it can be seen that the clip may be easily mounted on a rod and the sheet material quickly passed over one side of the clip's central portion and the oppositely facing sides of the legs.

It can also be appreciated from the construction described that the sheet material may be quickly removed from the clip. Furthermore, it can be appreciated that the clip can be positioned essentially anywhere on the rod and be used for any type of situation which requires securing sheet material to a rod.

These and other objects and advantages of the present invention will become more clearly understood from a consideration of the drawings and the following detailed description of a preferred embodiment.

BRIEF DESCRIPTION OF THE DRAWINGS

FIG. 1 is a fragmentary enlarged side view of a corner of a basket of wire-like rods and two of the clips according to the present invention, illustrating a condition where the two clips are mounted on rods adjacent a corner of the basket with the clips securing a liner of sheet material to the basket.

FIG. 2 is a fragmentary view of the embodiment of FIG. 1 taken from the inside of the basket.

FIG. 3 is an enlarged fragmentary, partial cross-sectional view, taken generally along line 3—3 in FIG. 1.

FIG. 4 is an enlarged front perspective view of the clip.

FIG. 5 is an enlarged rear perspective view of the clip.

FIG. 6 is a plan view of the clip.

FIG. 7 is a front elevational view of the clip.

FIG. 8 is a bottom view of the clip.

FIG. 9 is an edge elevational view of the clip.

FIG. 10 is a rear elevational view of the clip.

FIG. 11 is a cross-sectional view, taken generally along line 11—11 in FIG. 10.

FIG. 12 is a fragmentary, plan view of the clip, illustrating a condition wherein a rod (shown in cross-section) having a narrower diameter than the rod depicted in FIG. 3 is seated in an inner channel portion of the clip.

DETAILED DESCRIPTION OF THE PREFERRED EMBODIMENT

Referring now to the drawings, and more particularly to FIG. 1, there is shown generally at 10 a basket constructed typically of vinyl-coated horizontal rod members such as rods 12 and 14, which interconnect with vertical rod members such as rods 16, 18 and 20. A clip constructed according to the present invention is shown generally at 22, mounted on vertical rod 18. A second clip, shown generally at 24, is mounted on vertical rod 20.

A basket liner, shown generally at 26, is disposed inside basket 10 and extends along the bottom of the basket, up the sides and adjacent the top of the basket. Liner 26 is typically constructed of flexible sheet material or fabric 27, such as nylon or canvas, and is finished at its top edge 28 with a double hem tape 30 and stitched along the tape's lower edge.

Focusing now on FIGS. 4 and 5, clip 22 includes a body, shown generally at 32, which is typically constructed of resilient molded plastic. Body 32 has a front side 34, best seen in FIG. 4, and a rear side 36, seen best in FIG. 5.

Body 32 further includes a central or intermediate portion, shown generally at 38. Disposed in central portion 38 is an elongate channel, shown generally at 40 and a channel opening 42. A thin wall 43 is disposed opposite opening 42 and is flexible to permit enlargement of the channel opening so as to enable a rod, such as rod 18, to pass through opening 42 to be seated in channel 40. In order for clip 22 to hold firmly to rod 18, clip 22 is constructed so that the width of channel opening 42 is narrower than the width of channel 40.

As best seen in FIGS. 3-8 and 11-12, channel 40 has an inner channel portion 44 of a generally circular cross-section and an outer channel portion 46 of a generally circular cross-section joining with channel opening 42. Inner channel portion 44 has a smaller cross-section or diameter than outer channel portion 46. Inner channel portion 44 includes an opening 48, wherein the width of opening 48 is narrower than the width or diameter of inner channel portion 44. Similarly, the width of channel opening 42 is narrower than the width or diameter of outer channel portion 46.

In the embodiment shown in the drawings, dual channel portions are provided in order to accommodate two different gauge diameter of wire rods. The two most popular manufacturers of wire rod shelving and storage systems use rods which have different gauge diameters. One manufacturer primarily uses rods with a narrow diameter, and the other manufacturer primarily uses rods of a, comparatively, much larger diameter. In order for applicant's clips to be utilizable on both manufacturers' systems, the preferred embodiment of applicant's clip includes dual channel portions. FIG. 3 illustrates the use of applicant's clip with a wider diameter rod 18 which seats in outer channel portion 46, and FIG. 12 shows the use of applicant's clip with a narrower diameter rod 51 which seats in inner channel portion 44.

Clip 22 further includes gripping means, shown generally at 52, extending on body 32. Gripping means 52 includes a pair of front and a pair of rear legs or leg expanses 54a, 54b and 56a, 56b, respectively. Leg expanses 54a, 54b, 56a, 56b join at one set of ends with body 32 and have an opposite distal set of ends. Leg expanses 54a, 54b, 56a, 56b are substantially parallel to each other and extend in the same direction as channel 40. Front legs 54a, 54b are disposed laterally outwardly of central portion 38. Rear leg expanses 56a, 56b are disposed adjacent central portion 38 and are spaced from front legs 54a, 54b by slots 58a, 58b, which are best depicted in FIGS. 7 and 10. Front pair 54 is disposed generally within a first plane (shown in the foreground in FIG. 4) and rear pair 56 is disposed generally within a second plane which is spaced apart from and is parallel to the first plane. In the embodiment shown in the drawings, front leg expanse 54a and rear leg expanse 56a are disposed on one side of channel 40 and the other front leg expanse 54b and the other rear leg expanse 56b are disposed on the opposite side of channel 40.

Front pair of leg expanses 54a, 54b further includes catch means, shown generally at 60, disposed at the distal ends of legs 54a, 54b and located on side 36 of body 32. As best seen in FIGS. 1 and 5, catch means 60 includes enlarged, upwardly turned hooked portions 62, 64 which act to augment the gripping action of means 52 in gripping sheet material.

In operation, clip 22 is attached to basket 10 by aligning channel opening 42 with the longitudinal axis of a vertical rod 18 which is located adjacent a corner of basket 10, and then pressing the channel opening against the rod to enable the rod to pass through opening 42 and be seated in channel 40. Channel 40 is constructed so that by pressing the channel against a rod, the clip snaps onto the rod and grips the rod. Once the rod is seated in the channel and the clip properly oriented on the rod so that front side 34 faces inwardly of the basket, the top edge of liner 26 is passed over one side of central portion 40 and the oppositely facing sides of legs 54a, 54b when gripped. To better secure liner 26 to a corner of basket 10, another clip, such as clip 24, is placed on a second vertical rod, such as rod 20, located adjacent the corner, and liner 26 is secured to clip 24 in the manner just described.

The most efficient way to secure liner 26 to basket 10 is by positioning a pair of clips, such as clips 22, 24 at each of the four corners of the basket and securing liner 26 to the clip in the manner just described.

As illustrated in FIG. 3, wire 18 is snugly seated in channel 40. FIG. 3 further illustrates that channel opening 42 is narrower in width than the width or diameter of channel 40, and that liner 26 passes over central portion 38 and the oppositely facing sides of legs 54a, 54b when gripped.

FIGS. 1-3 best illustrate the method by which gripping means 52 grips liner 26 to hold it in position. FIGS. 1 and 2 also illustrate how catch means 60 augments the action of gripping means 52 to hold liner 26 in position by having hooks 62, 64 engage liner 26 just below the bottom edge of hem tape 30. By constructing liner 26 to have extra layers of material adjacent its upper edge 28, thereby adding to the bulk of liner 26, the gripping action of means 52 is enhanced.

From the construction described, it should be appreciated that catch means 60 may further include upwardly turning hooked portions disposed at the ends of leg expanses 56a, 56b located on the sides of legs 56a, 56b oppositely facing hooked portions 62, 64.

It should also be appreciated that an alternative embodiment may include one pair of opposed, parallel legs disposed on one side of channel 40, and a second pair of opposed, parallel legs disposed on the opposite side of channel 40, with the legs in each pair spaced apart from each other and separated by slots.

It should further be appreciated from the construction described that, although the clip of the present invention has been described for use with a basket and basket liner, applicant's invention could be used on any rod of compatible diameter to hold any type of sheet-like material in position. For instance, applicant's clip could be used in an office work place in combination with a bulletin board constructed of a grid of wire rods, with applicant's clip mounted on a rod of compatible diameter to hold a paper note in place, much as one would use a thumb tack to attach a note to a cork bulletin board.

While a particular embodiment of the invention has been described, it should be obvious that variations and modifications are possible without departing from the spirit of the invention.

We claim:

1. The combination of:
   a basket constructed of interconnecting wire-like rods,
   a basket liner of flexible sheet material extending inside said basket, and
   a clip securing a portion of said sheet material to said basket which is mounted on a rod of said basket, said clip comprising a body, a channel extending along a side of said body having a channel opening along said side, the rod seating within said channel and the opening being deformable to enable removal of the clip, and gripping means on said body disposed to a side of said channel gripping the sheet material.

2. A clip for securing sheet material to a rod comprising:
   a body having a central portion,
   a channel extending along said central portion having a channel opening disposed along a side of said central portion, the width of said channel opening being narrower than the width of the channel and the channel opening being deformable to enable the rod to pass through said opening to be seated in said channel, and
   gripping means extending on said body disposed laterally of said channel for gripping the sheet material, said gripping means comprising a pair of substantially parallel legs in said body extending in the same direction as the channel and disposed laterally outwardly of said central portion and spaced from said central portion by slots, the sheet material passing over one side of said central portion and oppositely facing sides of said legs when gripped.

3. The clip of claim 2, wherein said body is constructed of resilient molded plastic.

4. A clip for securing sheet material to a rod comprising:
   a body having a central portion,
   a channel extending along a side of said body and disposed in said central portion, said channel having a channel opening along said side, the width of said channel opening being narrower than the width of the channel and the channel opening being deformable to enable the rod to pass through said opening to be seated in said channel, and
   gripping means extending on said body disposed to a side of said channel for gripping the sheet material, said gripping means comprising a pair of front and a pair of rear substantially parallel leg expanses extending in the same direction as said channel and disposed laterally outwardly of said central portion, said front pair being disposed generally within a first plane and said rear pair being disposed generally within a second plane which is spaced from and is parallel to said first plane.

5. The clip of claim 4, wherein said body is constructed of resilient molded plastic.

6. The clip of claim 4, wherein one of said front leg expanses and one of said rear leg expanses is disposed on one side of said channel and the other front leg expanse and the other rear leg expanse is disposed on the opposite side of said channel.

7. The clip of claim 4, wherein said channel has an outer channel portion of a given cross-section joining with the opening, and an inner channel portion of smaller cross-section joining with the outer channel portion.

8. The clip of claim 7, wherein each of the channel portions has a generally circular cross-section.

9. The clip of claim 4, wherein said channel is bounded by a thin wall disposed opposite said opening which is flexible to permit enlargement of the channel.

10. The clip of claim 4, wherein at least one of said pairs of leg expanses includes catch means disposed on said one pair for holding the sheet material in place.

* * * * *